(12) United States Patent
Zhou et al.

(10) Patent No.: US 11,966,006 B2
(45) Date of Patent: Apr. 23, 2024

(54) CABLE DETECTION SYSTEM COMPRISING A PARALLEL LIGHT SHARPENS A BOUNDARY BETWEEN DIFFERENT SECTIONS OF THE CABLE IN A CAPTURED IMAGE

(71) Applicants: Tyco Electronics (Shanghai) Co. Ltd, Shanghai (CN); TE Connectivity Services GmbH, Schaffhausen (CH); Kunshan League Automechanism Co., Ltd, Kunshan (CN)

(72) Inventors: Lei (Alex) Zhou, Shanghai (CN); Dandan (Emily) Zhang, Shanghai (CN); Roberto Francisco-Yi Lu, Bellevue, WA (US); Sonny O. Osunkwo, Middletown, PA (US); Sai Tarun Kosaraju, Plymouth, MN (US); Cong Lin, Kunshan (CN); Tianshu Wu, Kunshan (CN)

(73) Assignees: TE Connectivity Solutions GmbH, Schaffhausen (CH); Kunshan League Automechanism Co., Ltd., Kunshan (CN); Tyco Electronics (Shanghai) Co., Ltd., Shanghai (CN)

( * ) Notice: Subject to any disclaimer, the term of this patent is extended or adjusted under 35 U.S.C. 154(b) by 127 days.

(21) Appl. No.: 17/845,220

(22) Filed: Jun. 21, 2022

(65) Prior Publication Data
US 2022/0404522 A1    Dec. 22, 2022

(30) Foreign Application Priority Data
Jun. 21, 2021 (CN) .......................... 202110684502.0

(51) Int. Cl.
| G01B 11/02 | (2006.01) |
| G01V 8/20 | (2006.01) |
| G03B 15/02 | (2021.01) |
| G03B 17/56 | (2021.01) |

(52) U.S. Cl.
CPC ............... G01V 8/20 (2013.01); G03B 15/02 (2013.01); G03B 17/561 (2013.01)

(58) Field of Classification Search
CPC .......... G01V 8/20; G03B 15/02; G03B 15/03; G03B 17/56; G03B 23/00; G01B 11/08; G01B 11/02; G01B 1/00; G01B 11/24
USPC .................................. 250/559.4, 221, 208.1
See application file for complete search history.

(56) References Cited

U.S. PATENT DOCUMENTS 7,259,873 B2 * 8/2007 Sikora ................ G01B 11/2433
356/640

* cited by examiner

*Primary Examiner* — Que Tan Le
(74) *Attorney, Agent, or Firm* — Barley Snyder

(57) ABSTRACT

A cable detection system for detecting an end of a cable having a plurality of exposed different sections includes an illumination device and a camera. The illumination device emits an illuminating light to the end of the cable. The illumination device simultaneously emits a parallel light and a diffuse light to the end of the cable. The camera captures an image of the end of the cable. The parallel light sharpens a boundary between the different sections of the cable in the image, and the diffuse light clarifies a surface of the different sections in the image.

20 Claims, 7 Drawing Sheets

CABLE DETECTION SYSTEM COMPRISING A PARALLEL LIGHT SHARPENS A BOUNDARY BETWEEN DIFFERENT SECTIONS OF THE CABLE IN A CAPTURED IMAGE

CROSS-REFERENCE TO RELATED APPLICATION

This application claims the benefit of the filing date under 35 U.S.C. § 119(a)-(d) of Chinese Patent Application No. 202110684502.0, filed on Jun. 21, 2021.

FIELD OF THE INVENTION

The present invention relates to a cable detection system.

BACKGROUND

In the prior art, the end of the cable needs to be processed before electrical connection. For example, the processed end of the cable has a section of exposed conductor, a section of exposed inner insulating layer, and a section of exposed shielding layer. Generally, the length of each exposed section of the processed end of the cable needs to be tested. In the prior art, the work of detecting the length of each exposed section usually faces three problems: the boundary between adjacent sections on the end of the cable is not clear, there is a lack of fixture suitable for fixing cables with different diameters, and a lack of portable detection equipment that is easy to install.

SUMMARY

A cable detection system for detecting an end of a cable having a plurality of exposed different sections includes an illumination device and a camera. The illumination device emits an illuminating light to the end of the cable. The illumination device simultaneously emits a parallel light and a diffuse light to the end of the cable. The camera captures an image of the end of the cable. The parallel light sharpens a boundary between the different sections of the cable in the image, and the diffuse light clarifies a surface of the different sections in the image.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
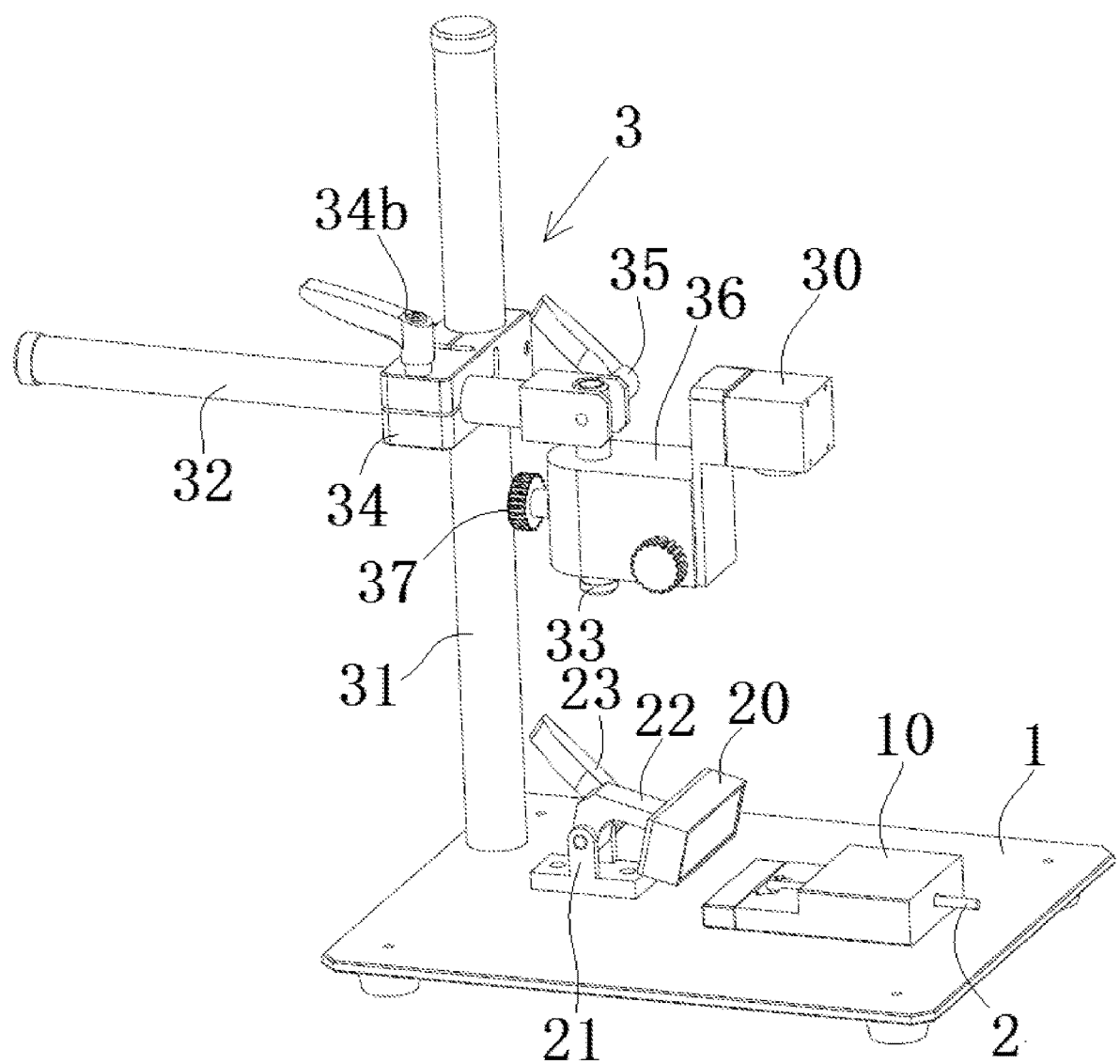
FIG. 1 is a perspective view of a cable detection system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown to simplify the drawing.

Figure 2:
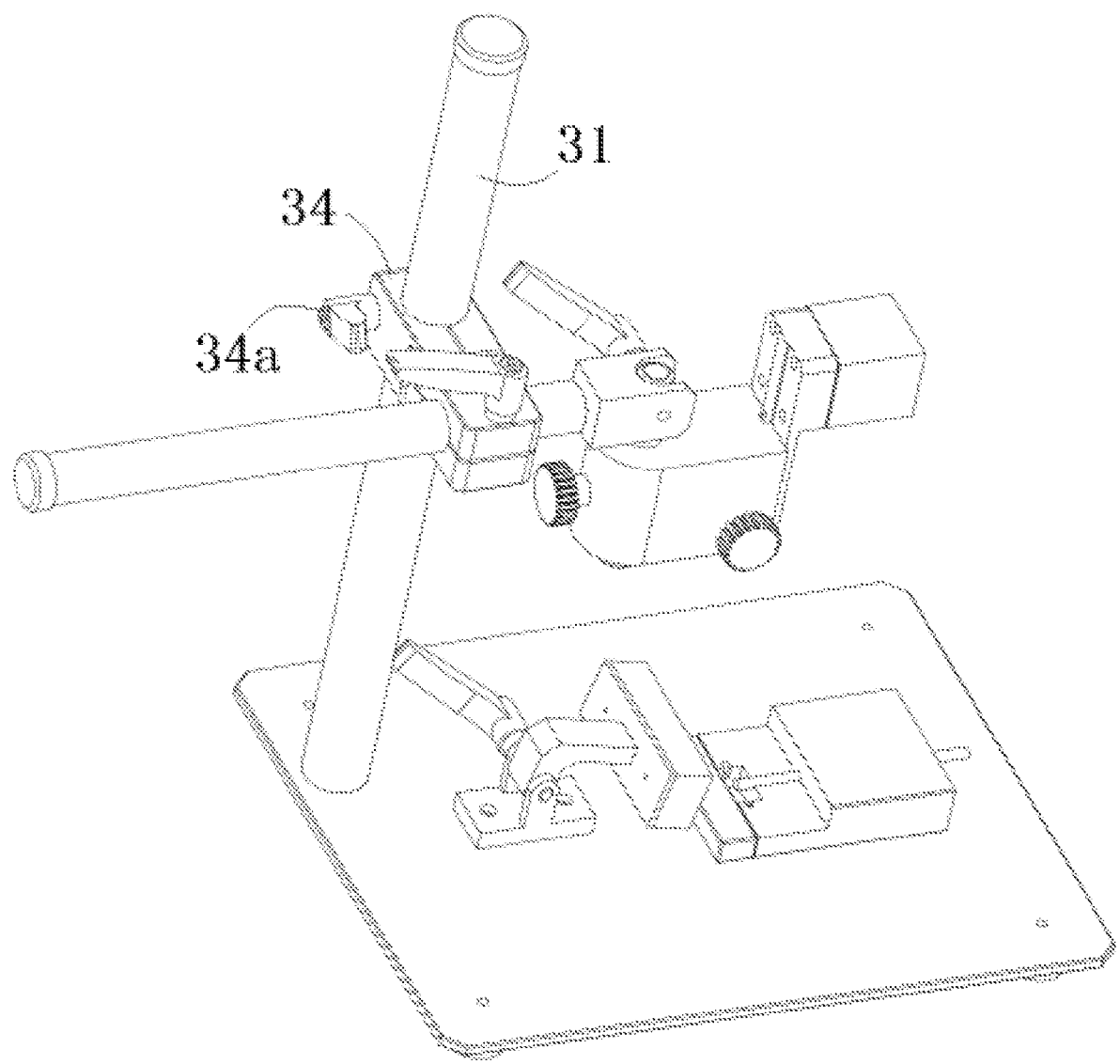
FIG. 2 is another perspective view of the cable detection system.
Figure 4:
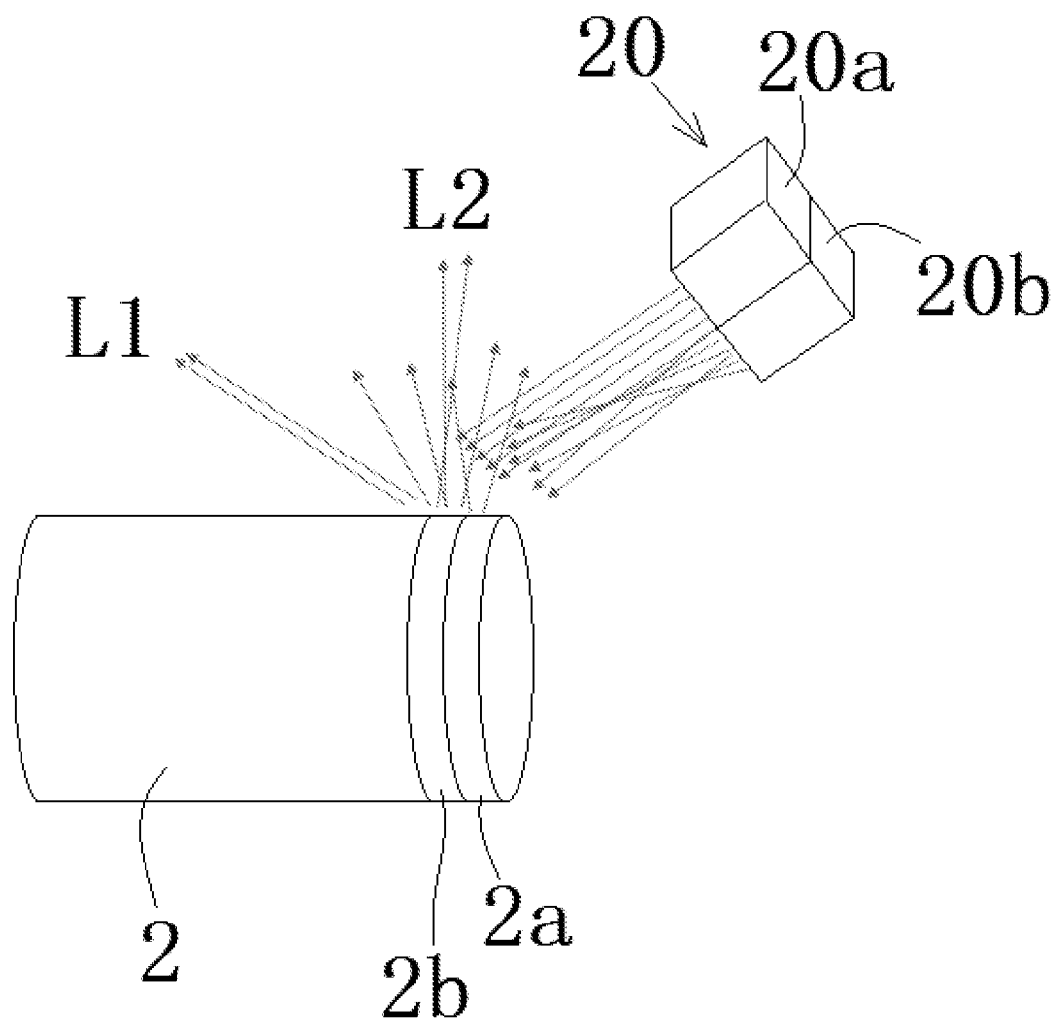
FIG. 4 is a schematic diagram of an illumination device of the cable detection system illuminating an end of a cable.

As shown in FIGS. 1-2 and 4, in the illustrated embodiment, the cable detection system is used to detect the end of cable 2. The end of the cable 2 includes a plurality of different exposed sections 2a and 2b. The cable 2 can be a cable, and the exposed multiple different sections 2a and 2b may comprise a section of exposed conductor 2a and a section of exposed inner insulating layer 2b at the end of the cable 2.

As shown in FIGS. 1-2 and 4, in the illustrated embodiment, the cable detection system includes an illumination device 20 and a camera 30. The camera 30 is used to capture an image of the end of the cable 2. The illumination device 20 is used to emit light to the end of the cable 2 to provide illumination for the camera 30.

Figure 4A:
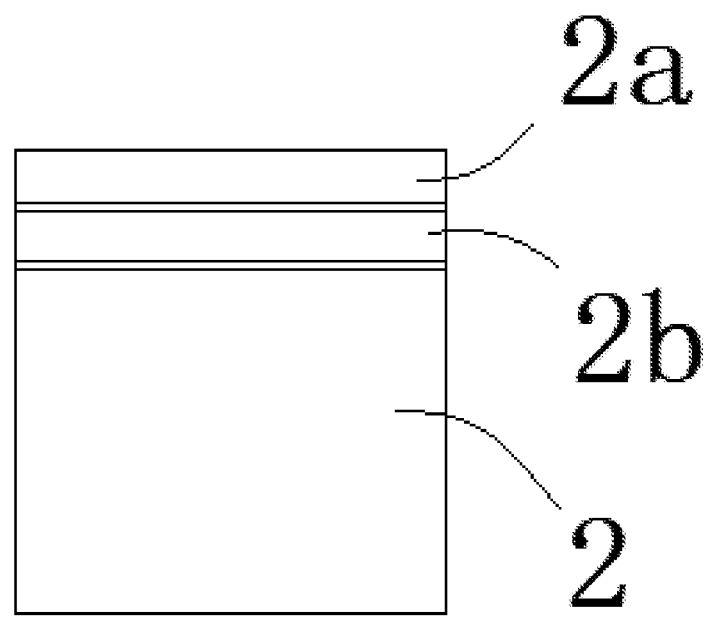
FIG. 4a is a schematic diagram of an image of the end of the cable capture by a camera when illuminated with the illumination device.

FIG. 4a is a schematic diagram of the image of the end of the cable 2 captured by the camera 30 when the end of the cable 2 is illuminated by the illumination device 20 shown in FIG. 4.

As shown in FIGS. 1-2, 4 and 4a, in the illustrated embodiment, the illumination device 20 is adapted to simultaneously emit parallel light and diffuse light to the end of the cable 2. The parallel light is used to sharpen the boundary between different sections 2a and 2b in the captured image, so as to accurately detect the length of each section 2a, 2b on the end of the cable 2 and improve the length detection accuracy. The diffuse light is used to clarify the surface of different sections 2a and 2b in the captured image. In this way, as shown in FIG. 4a, a clear image of the end of the cable 2 can be taken. Thus the present invention also can detect whether there is a quality defect on the end of the cable 2 according to the surface image of each section 2a, 2b.

As shown in FIGS. 1-2, 4 and 4a, in order to simultaneously emit parallel light and diffuse light to the end of the cable 2, in the illustrated embodiment, the illumination device 20 includes a first light source 20a and a second light source 20b. The first light source 20a is adapted to emit parallel light to the end of the cable 2. The second light source 20b is adapted to emit diffuse light to the end of the cable 2.

The function of the parallel light and diffuse light emitted by the illumination device 20 will be explained in detail below with reference to FIGS. 5 and 6.

Figure 5:
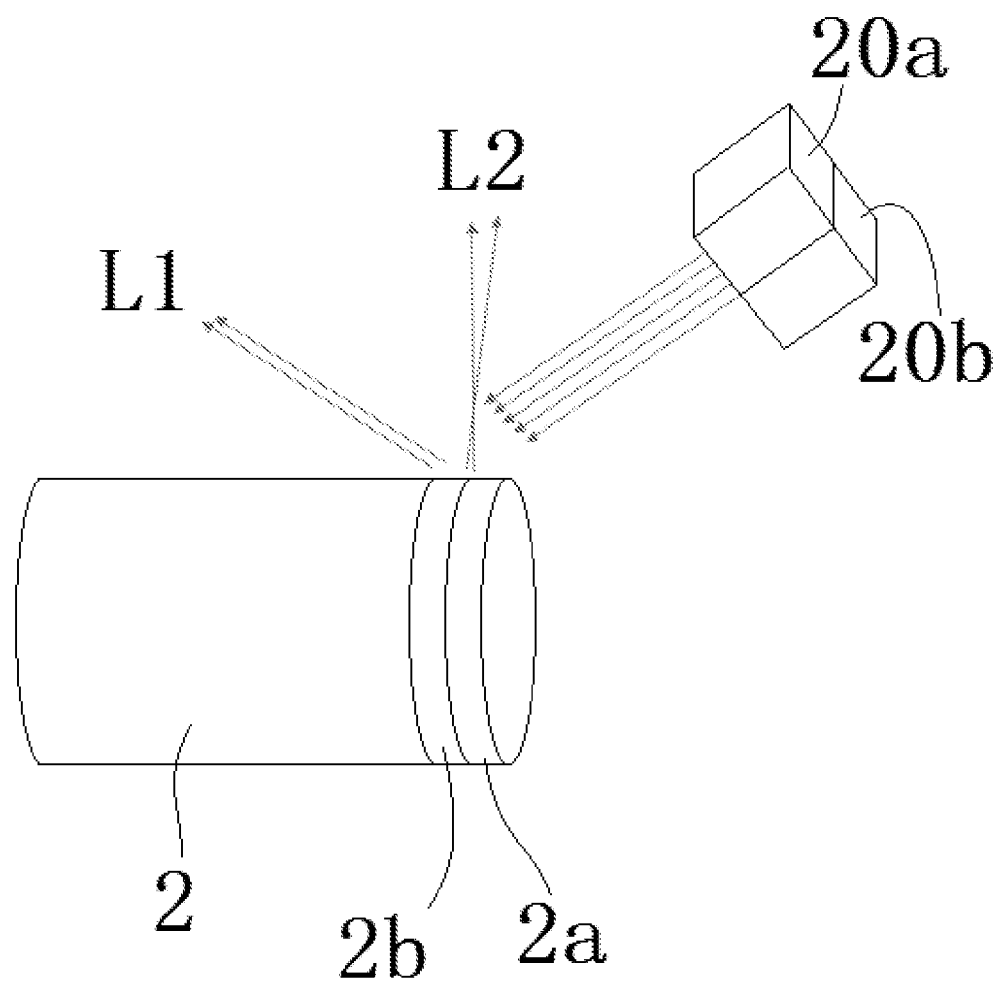
FIG. 5 is a schematic diagram of a first light source of the illumination device emitting parallel lights to the end of the cable.

FIG. 5 shows a schematic diagram of emitting parallel light to the end of the cable 2 with the first light source 20a of the illumination device 20 shown in FIG. 4. As shown in FIG. 5, when the first light source 20a of the illumination device 20 emits parallel light to the end of the cable 2, the parallel light incident on the surface of each section 2a and 2b is specularly reflected, and the parallel light incident on the boundary between the sections 2a and 2b is diffusely reflected in all directions.

As shown in FIG. 5, the specular reflected light L1 reflected by the surface of each section 2a and 2b deviates from the camera 30 and cannot enter the camera 30. The diffuse reflected light L2 diffusely reflected in all directions by the boundary between sections 2a and 2b can enter the camera 30. Therefore, if there is only the first light source 20a emitting parallel light, the camera can only capture the boundary between sections 2a and 2b, and cannot capture the surface of each section 2a and 2b.

Figure 6:
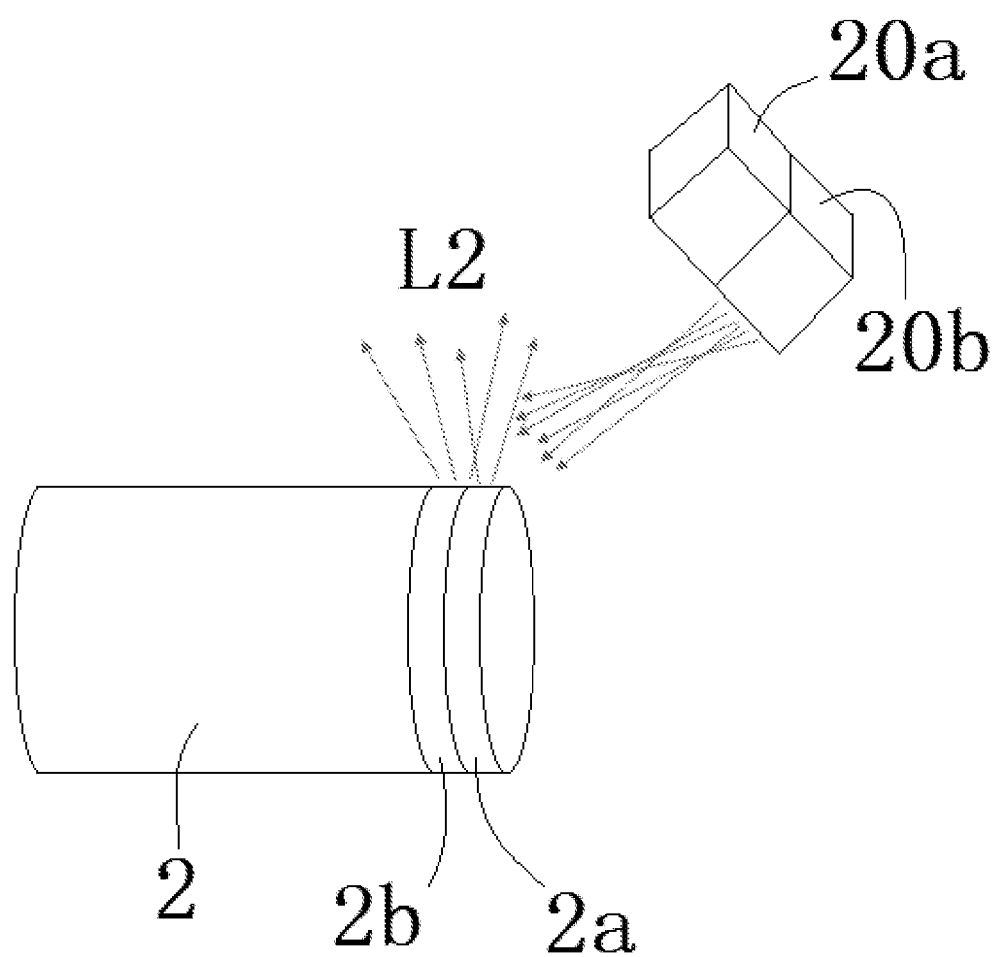
FIG. 6 is a schematic diagram of a second light source of the illumination device emitting diffuse light to the end of the cable.

FIG. 6 shows a schematic diagram of emitting diffuse light to the end of the cable 2 with the second light source 20b of the illumination device 20 shown in FIG. 4. As shown in FIG. 6, when the second light source 20b of the illumination device 20 emits diffuse light to the end of the cable 2, the diffuse light incident on the surface of each section 2a and 2b and the boundary between sections 2a and 2b is diffusely reflected in all directions, and these diffuse reflected light L2 can enter the camera 30. Therefore, if there is only the second light source 20b emitting diffuse light, the camera 30 can capture the surface of sections 2a and 2b and the boundary between sections 2a and 2b at the same time. However, the brightness of the boundary between sections 2a and 2b is almost the same as that of the surfaces of sections 2a and 2b, so it is difficult to distinguish the boundary between sections 2a and 2b.

As shown in FIG. 4, in the illustrated embodiment, since the illumination device 20 simultaneously emits parallel light and diffuse light to the end of the cable 2, the boundary between different sections 2a and 2b in the captured image can be sharpened by the parallel light, and the surfaces of different sections 2a and 2b in the captured image can be clarified by the diffuse light.

As shown in FIGS. 1-2, 4 and 4-6, in the illustrated embodiment, the first light source 20a is arranged on the top or bottom of the second light source 20b, and the first light source 20a and the second light source 20b may be installed in the same housing.

Note that the illumination device 20 of the present invention is not limited to the illustrated embodiment. For example, in another exemplary embodiment of the present invention, the illumination device 20 may include a light source and a diffuse reflection plate. The light source is adapted to emit parallel light to the end of the cable 2. The diffuse reflection plate is arranged in front of the light source and is used to convert part of the parallel light emitted by the light source into diffuse light.

Figure 3:
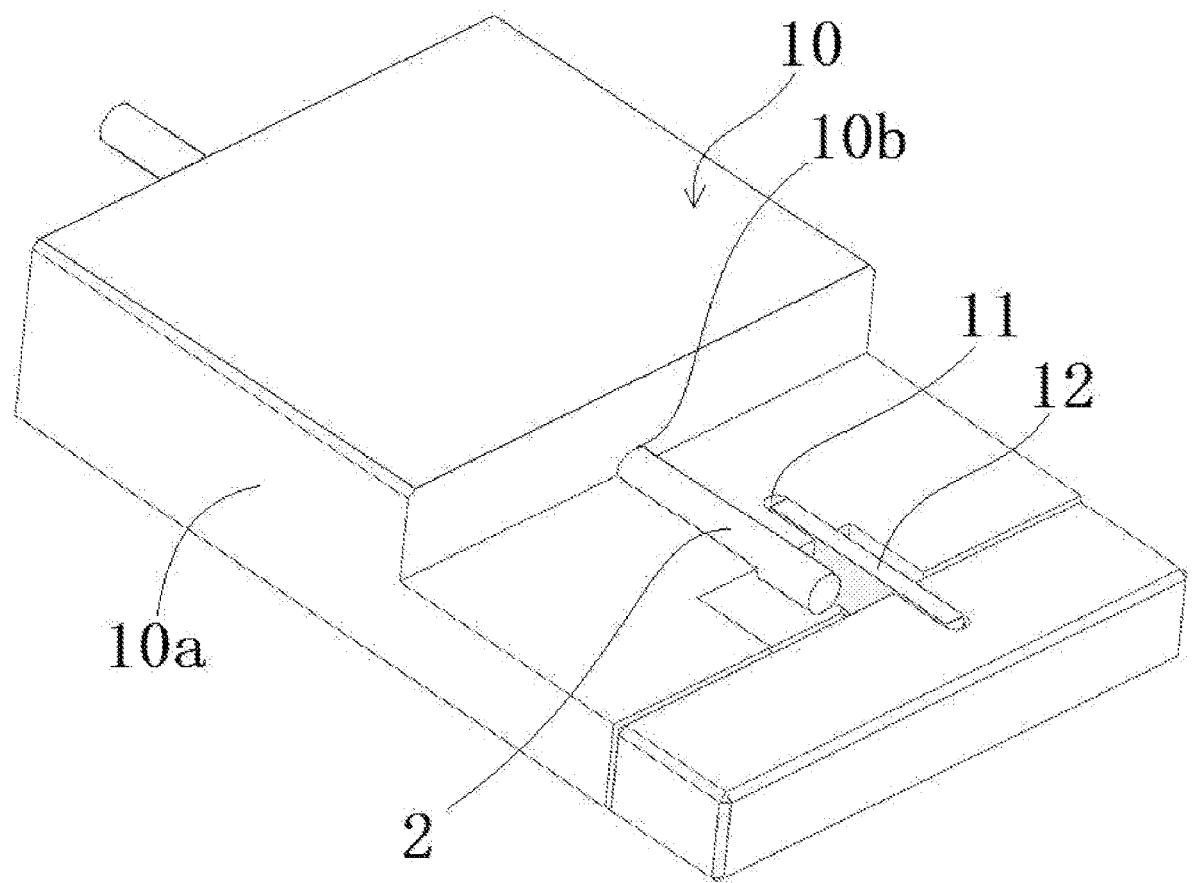
FIG. 3 is a perspective view of a cable fixture of the cable detection system.

FIG. 3 shows a perspective view of a cable fixture 10 of a cable detection system according to an exemplary embodiment of the present invention.

As shown in FIGS. 1 to 3, in the illustrated embodiment, the cable detection system also includes a light source mounting seat 21. The illumination device 20 is rotatably mounted on the light source mounting seat 21 so that the angle of the illumination device 20 relative to the end of the cable 2 can be adjusted, so that the illumination device 20 can be adjusted to an appropriate angle according to the position of the camera 30 and the position of the end of the cable 2.

As shown in the embodiment of FIG. 1, the cable detection system further comprises a connecting arm 22 and a connecting member 23. One end of the connecting arm 22 is connected to the illumination device 20. The connecting member 23 rotatably connects the other end of the connecting arm 22 to the light source mounting seat 21. The connecting member 23 is adapted to be rotated between a release position and a locking position. When the connecting member 23 is rotated to the release position, the connecting arm 22 is released to allow adjust the illumination device 20 to the appropriate angle by rotation. When the connecting member 23 is rotated to the locking position, the connecting arm 22 is locked to fix the illumination device 20 at the appropriate angle.

As shown in FIGS. 1 to 3, in the illustrated embodiment, the cable detection system also includes a cable fixture 10 for holding and positioning the cable 2. As shown in FIG. 3, the cable fixture 10 includes a base 10a and a positioning hole 10b formed in the base 10a. The cable 2 is inserted and positioned in the positioning hole 10b, and the end of the cable 2 is exposed from the positioning hole 10b.

In the embodiment as shown in FIG. 3, the positioning hole 10b on the cable fixture 10 extends in a horizontal direction, and the size of the positioning hole 10b is usually set to be able to insert the cable 2 with the largest diameter. In this way, it can be applied to many kinds of cables smaller than the maximum diameter.

As shown in FIG. 3, a slot 11 is formed on the base 10a, and the cable fixture 10 also includes a size calibration block 12 embedded in the slot 11. The illumination device 20 is adapted to simultaneously emit illumination light to the end of the cable 2 and the size calibration block 12, and the camera 30 is adapted to simultaneously capture an image of the end of the cable 2 and an image of the size calibration block 12. The cable detection system also includes a calibration device (which can be a computer running calibration software), which is suitable for calibrating the parameters of the camera 30 according to the captured image of the size calibration block 12. Since the dimensional accuracy of the size calibration block 12 is very high, the parameters in the pixel conversion matrix of the camera 30 are calibrated according to the captured image of the size calibration block 12.

As shown in FIGS. 1 and 2, the cable detection system also includes a camera mounting frame 3, and the camera 30 is installed on the camera mounting frame 3 and is located above the end of the cable 2. The camera mounting frame 3 is an adjustable frame, so that the position of the camera 30 can be adjusted by adjusting the camera mounting frame 3.

As shown in FIGS. 1 and 2, the camera mounting frame 3 mainly includes a post 31, a slider 34, a sliding rod 32 and a mounting seat 36. The post 31 extends in a vertical direction perpendicular to the axial direction of the cable 2. The slider 34 is mounted on the post 31 and can slide along the post 31 and rotate around the post 31. The sliding rod 32 is mounted on the slider 34 and can slide in a horizontal direction perpendicular to the post 31 relative to the slider 34 and rotate around its own axis. Mounting seat 36 is connected to one end of slide 32. The camera 30 may be fixed to the mounting seat 36 so that the position of the camera 30 can be adjusted by sliding and/or rotating at least one of the slider 34 and the slider 32.

The camera mounting frame 3, as shown in FIGS. 1 and 2, also includes a first locking device 34a and a second locking device 34b. The first locking device 34a is installed on the slider 34 for locking the slider 34 on the post 31 after the slider 34 is adjusted in place. The second locking device 34b is installed on the slider 34 to lock the slider 32 on the slider 34 after the slider 32 is adjusted in place.

As shown in FIG. 1, in the illustrated embodiment, the camera mounting frame 3 also includes a vertical rod 33 parallel to the post 31, and one end of the vertical rod 33 is connected to one end of the sliding rod 32. The mounting seat 36 is mounted on the vertical rod 33 and can slide along the vertical rod 33 and rotate around the vertical rod 33, so that the position of the camera 30 can be fine tuned by sliding and or rotating the mounting seat 36.

As shown in FIG. 1, in the illustrated embodiment, the camera mounting frame 3 also includes a third locking device 37. The third locking device 37 is mounted on the mounting seat 36 for locking the mounting seat 36 on the vertical rod 33 after the mounting seat 36 is adjusted in place.

As shown in FIG. 1, the camera mounting frame 3 also includes a connecting piece 35, which detachably connects and fixes one end of the vertical rod 33 to one end of the sliding rod 32.

As shown in FIG. 1, the cable detection system also includes a bottom seat 1. The cable fixture 10, the light source mounting seat 21 and the camera mounting frame 3 are fixed on the bottom seat 1. In the present invention, the whole cable detection system has the advantages of small volume, light weight, easy carrying and convenient use.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cable detection system for detecting an end of a cable having a plurality of exposed different sections, comprising:
   an illumination device emitting an illuminating light to the end of the cable, the illumination device simultaneously emits a parallel light and a diffuse light to the end of the cable; and
   a camera capturing an image of the end of the cable, the parallel light sharpens a boundary between the different sections of the cable in the image, and the diffuse light clarifies a surface of the different sections in the image.

2. The cable detection system of claim 1, wherein the illumination device includes a first light source emitting the parallel light to the end of the cable and a second light source emitting the diffuse light to the end of the cable.

3. The cable detection system of claim 2, wherein the first light source is arranged on a top or bottom of the second light source, the first light source and the second light source are installed in a same housing.

4. The cable detection system of claim 1, wherein the illumination device includes a light source emitting the parallel light to the end of the cable and a diffuse reflection plate arranged in front of the light source, the diffuse reflection plate converting part of the parallel light emitted by the light source into the diffuse light.

5. The cable detection system of claim 1, further comprising a light source mounting seat, the illumination device is rotatably mounted on the light source mounting seat so that an angle of the illumination device relative to the end of the cable is adjustable, the illumination device is adjusted to an appropriate angle according to a position of the camera and the position of the end of the cable.

6. The cable detection system of claim 5, further comprising a connecting arm, a first end of the connecting arm is connected to the illumination device.

7. The cable detection system of claim 6, further comprising a connecting member rotatably connecting a second end of the connecting arm to the light source mounting seat.

8. The cable detection system of claim 7, wherein the connecting member is rotated between a release position and a locking position, when the connecting member is rotated to the release position the connecting arm is released to allow adjustment of the illumination device to the appropriate angle by rotation, and when the connecting member is rotated to the locking position the connecting arm is locked to fix the illumination device at the appropriate angle.

9. The cable detection system of claim 1, further comprising a cable fixture clamping and positioning the cable.

10. The cable detection system of claim 9, wherein the cable fixture has a base and a positioning hole formed in the base, the cable is inserted and positioned in the positioning hole and the end of the cable is exposed out of the positioning hole.

11. The cable detection system of claim 10, wherein the base has a slot and the cable fixture has a size calibration block embedded in the slot.

12. The cable detection system of claim 11, wherein the illumination device simultaneously emits light to the end of the cable and the size calibration block, the camera simultaneously captures the image of the end of the cable and an image of the size calibration block.

13. The cable detection system of claim 12, further comprising a calibration device calibrating a plurality of parameters of the camera according to the image of the size calibration block.

14. The cable detection system of claim 1, further comprising a camera mounting frame, the camera is installed on the camera mounting frame and is located above the end of the cable.

15. The cable detection system of claim 14, wherein the camera mounting frame is an adjustable frame so that a position of the camera is adjustable by adjusting the camera mounting frame.

16. The cable detection system of claim 15, wherein the camera mounting frame includes a post extending in a vertical direction perpendicular to an axial direction of the cable, a slider mounted on the post and capable of sliding along and rotating around the post, a sliding rod installed on the slider and capable of sliding in a horizontal direction perpendicular to the post relative to the slider and rotating around its own axis, and a mounting seat connected to one end of the sliding rod, the camera is fixed to the mounting seat so that the position of the camera is adjustable by sliding and/or rotating at least one of the slider and the sliding rod.

17. The cable detection system of claim 16, wherein the camera mounting frame includes a first locking device installed on the slider for locking the slider on the post after the slider is adjusted and a second locking device installed on the slider for locking the sliding rod on the slider after the sliding rod is adjusted.

18. The cable detection system of claim 16, wherein the camera mounting frame has a vertical rod parallel to the post, an end of the vertical rod is connected to the one end of the sliding rod, the mounting seat is mounted on the vertical rod and is capable of sliding along the vertical rod and rotating around the vertical rod, the position of the camera is finely adjustable by sliding and/or rotating the mounting seat.

19. The cable detection system of claim 18, wherein the camera mounting frame includes a third locking device installed on the mounting seat and locking the mounting seat on the vertical rod after the mounting seat is adjusted.

20. The cable detection system of claim 18, wherein the camera mounting frame has a connecting piece that connects and fixes the vertical rod to the sliding rod in a detachable manner.

* * * * *